J. W. OWENS.
METHOD FOR USE IN CONNECTION WITH THE TESTING OF MATERIALS.
APPLICATION FILED FEB. 3, 1920.
1,397,541.
Patented Nov. 22, 1921.
4 SHEETS—SHEET 1.
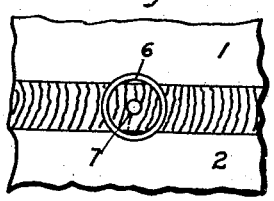
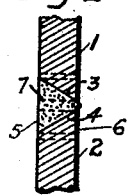
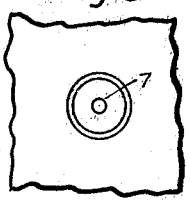
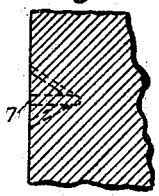
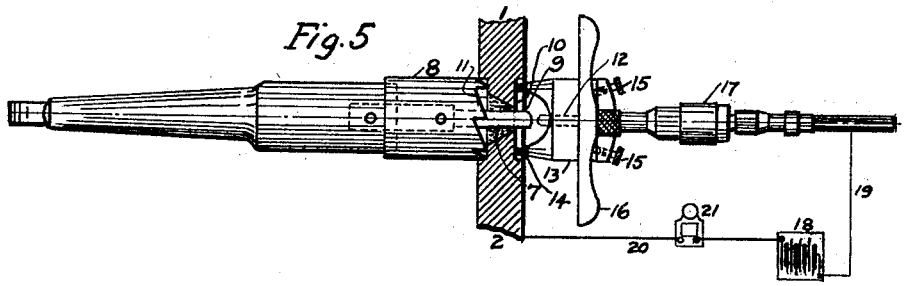
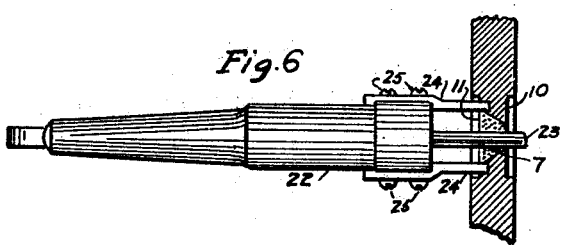
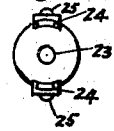
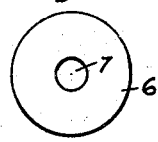
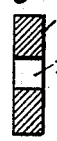
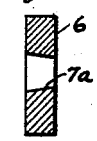
James W. Owens INVENTOR
BY
Prindle, Wright & Small ATTORNEYS J. W. OWENS.
METHOD FOR USE IN CONNECTION WITH THE TESTING OF MATERIALS.
APPLICATION FILED FEB. 3, 1920.
1,397,541.
Patented Nov. 22, 1921.
4 SHEETS—SHEET 2.
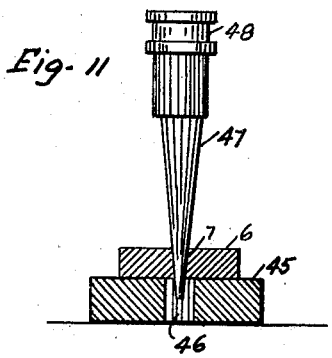
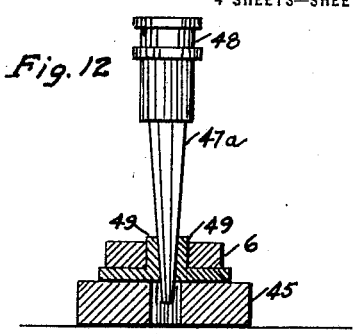
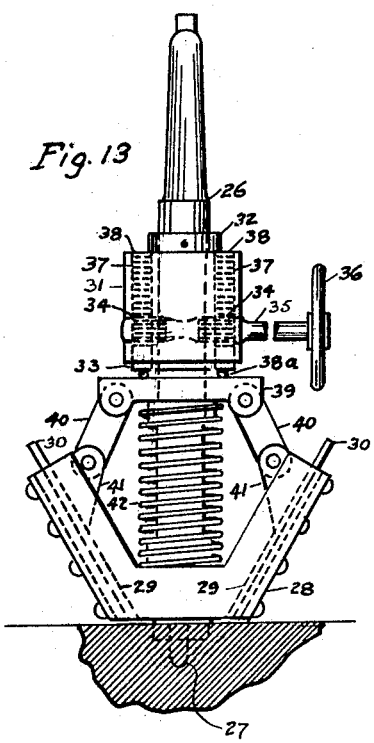
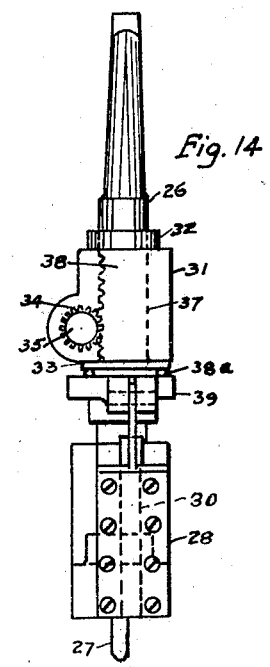
James W. Owens  INVENTOR
BY
Prindle, Wright & Small  ATTORNEYS J. W. OWENS.
METHOD FOR USE IN CONNECTION WITH THE TESTING OF MATERIALS.
APPLICATION FILED FEB. 3, 1920.
1,397,541.
Patented Nov. 22, 1921.
4 SHEETS—SHEET 3.
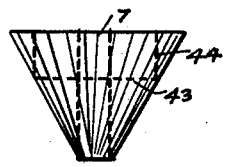
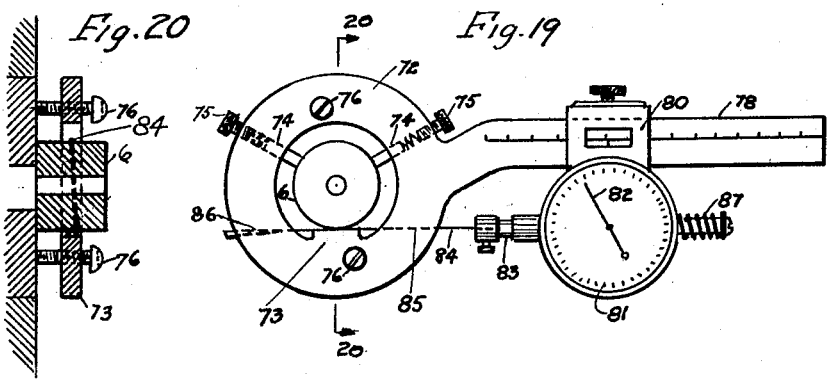
James W. Owens INVENTOR
BY
Prindle, Wright & Small ATTORNEYS

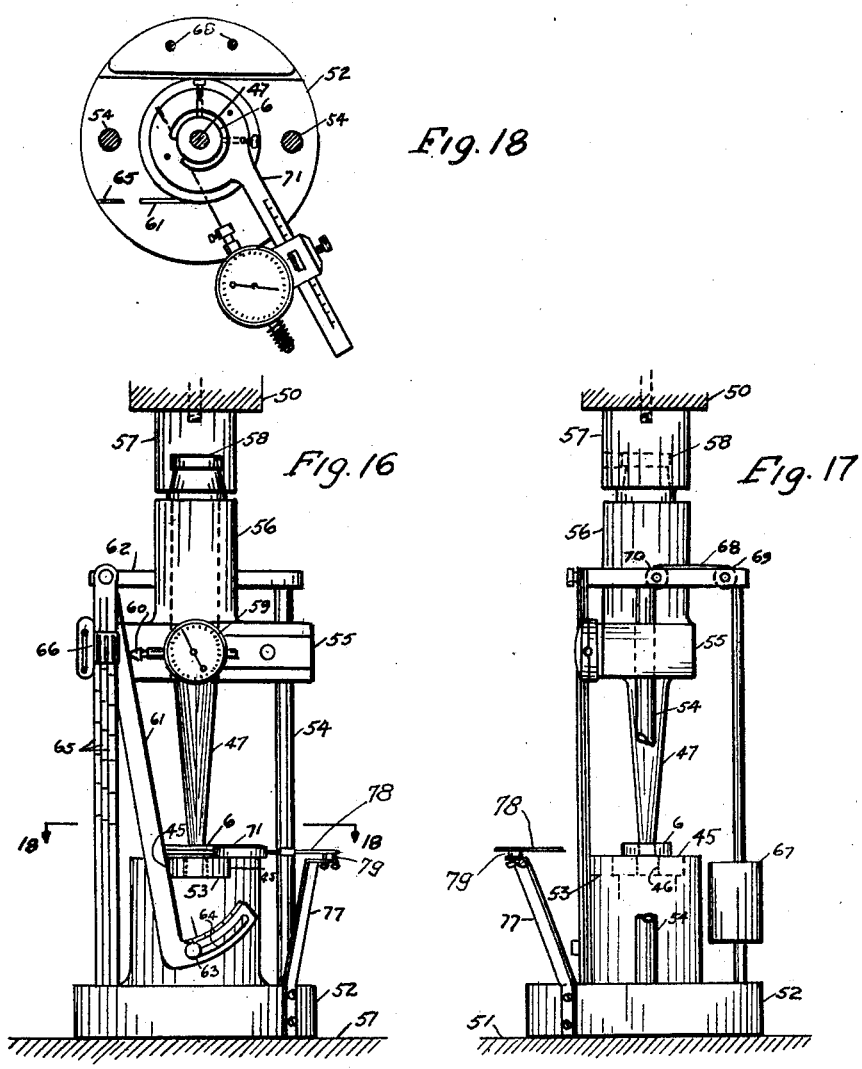

UNITED STATES PATENT OFFICE.

JAMES W. OWENS, OF CRADOCK, VIRGINIA, ASSIGNOR TO TINIUS OLSEN TESTING MACHINE COMPANY, OF PHILADELPHIA, PENNSYLVANIA, A CORPORATION OF PENNSYLVANIA.

METHOD FOR USE IN CONNECTION WITH THE TESTING OF MATERIALS.

1,397,541.      Specification of Letters Patent.      Patented Nov. 22, 1921.

Application filed February 3, 1920. Serial No. 356,064.

*To all whom it may concern:*

Be it known that I, JAMES W. OWENS, a citizen of the United States, residing at 2 Afton Parkway, Cradock, in the county of Norfolk and State of Virginia, have invented a certain new and useful Method for Use in Connection with the Testing of Materials, of which the following is a specification.

The invention has for an object to provide a method of operating upon materials desired to be tested or examined, whereby a test specimen may be removed readily from a larger mass of material, preferably while such mass is *in situ*, so to speak; to the end that such a specimen may be obtained from bulky bodies, or materials which have been incorporated into a large structure, or from other locations where the conditions render it difficult or impossible to obtain a test specimen by operating upon the material in a machine tool or by other ordinary methods.

Another object is to obtain a test specimen in such a manner as not to produce any substantial impairment of the material as a whole, thus rendering it possible to test finished structures without undue mutilation, and with only such small damage that they may be readily repaired to their original conditions.

Further objects and advantages of the invention will be in part obvious, and in part specifically pointed out in the description contained hereinafter.

Although capable of broader application, the invention is particularly useful in connection with the testing of welded metals or homogeneous bodies of metal such as are used for structural purposes. For example, it is obviously desirable to test the strength of steel beams, welded ship plates, welded boiler seams or the like, but test specimens of such bodies cannot be readily obtained by placing the structures in a machine tool and cutting out a section for test, nor can the structure, a welded seam for instance, be impaired to any substantial extent in strength or tightness without rendering test impractical. However, it is desirable that the test specimens be obtained from the actual commercial product, since the results obtained from special test pieces made up separately, do not always give a correct basis for determining the qualities of the product itself.

The invention therefore will be disclosed as applied to metals of the above character, but such disclosure is to be considered merely illustrative of its principle. In the drawings—

Figures 1 and 2 are respectively a plan and cross-sectional view of a welded plate construction from which a test specimen is to be removed.

Figs. 3 and 4 are similar views illustrating the application of the invention to a bulky body of material.

Fig. 5 is a view showing a facing tool and gage, mounted in operative position with relation to a plate construction such as shown in Figs. 1 and 2.

Fig. 6 is a view similar to Fig. 5, but showing a rotary cutting tool in operative position.

Fig. 7 is an end view of the cutting tool shown in Fig. 6.

Figs. 8 and 9 are respectively a front view and central section of a test specimen after being removed from a plate structure such as is illustrated in Fig. 1.

Fig. 10 is a central section showing a modified form of test specimen.

Fig. 11 shows a plug in operative position to test the strength of a specimen such as shown in Figs. 8 and 9, and Fig. 12 shows a modification in the manner of applying such a plug to a test specimen.

Figs. 13 and 14 are respectively a front view and side elevation of a modified form of rotary cutting tool adapted to operate on bulky bodies to be tested.

Fig. 15 illustrates the manner in which a test specimen may be obtained from the material removed by a tool such as is shown in Figs. 13 and 14.

Figs. 16 and 17 are front and side views respectively showing a test specimen in position to be tested in a testing machine.

Fig. 18 is a section on line 18—18 of Fig. 16 looking in the direction of the arrows.

Figs. 19 and 20 are respectively a plan and side elevation of a ductility gage adapted to be used in connection with the testing machine illustrated in Figs. 16 to 18.

In Figs. 1 and 2 there are shown portions of metallic plates 1 and 2, having beveled sides 3 and 4 respectively, which plates have been juxtaposed and butt-welded by depositing metal 5 into the space between the beveled edges 3 and 4, thus forming a butt-welded plate construction of common form.

In case such a welded plate is to be incorporated for instance into a pressure tank, or the hull of a ship, it is obviously desirable to determine the strength of the weld by actual test of the material itself, rather than by test of an additional special weld made up solely for the purpose of test. On the other hand, test specimens must be obtained from the actual finished product in such a way as not to impair the strength of the material, or damage it to such an extent as to reduce its serviceability when put into actual use. Furthermore, since the hull of a ship or a pressure tank cannot be placed in metal working machines to remove the test specimens, such specimen must be obtained by operations which can be carried on without requiring handling of the material, or while it is *in situ*, so to speak.

In order that the removal of a test specimen may not unduly impair the serviceability of the finished product, a test specimen preferably is employed of such small dimensions that the void left within the product after the specimen is removed, can be readily refilled by depositing metal on to the product after the test specimen has been removed. For instance, in the plate construction shown in Fig. 1, a ring 6 may be cut out by suitable tools, of a diameter in the neighborhood of 2" for steel plates of ordinary thickness, after which the cylindrical hole in the plate construction formed by the removal of the ring 6 can readily be refilled by the deposition of metal therewithin, leaving the product substantially in the same condition as it was before the test specimen had been removed. The specimen 6 can then be tested to determine its strength or other characteristics, or perhaps filed away to be later compared with other specimens obtained after the product has been in service.

Removal of a test specimen is preferably, but not necessarily, accomplished by the use of rotary cutting tools, since tools of this character may be readily made portable, so as to be adapted for removing a test specimen from any desired point on a large finished structure. As is illustrated in Figs. 5 and 6, welded plates such as the plates 1 and 2 previously described, may be bored out with an ordinary drill to provide a hole 7 extending through the structure. If it is desired to obtain specimens of standard thickness, a facing tool 8 having a pilot pin 9 may be employed, the pin 9 being inserted within the previously drilled hole 7, and a finished surface 10 provided on one side of the plate construction. Facing tool 8 may then be reversed, to finish off an opposing surface 11 on the plate construction, thus leaving material for a test specimen of any desired thickness, and with parallel end faces.

In the present instance the thickness of the material to form the test specimen is determined by means of a gage shown at the right of Fig. 5, which gage has a pin 12 adapted to contact with the pilot pin on the facing tool 8 when the facing tool has penetrated to the proper depth. As shown, pin 12 is carried by a standard 13, having insulated feet 14 adapted to rest on the finished surface 10, such standard being secured by suitable screws 15 to a bar 16, through which extends the handle 17, having any suitable micrometer arrangement (which it is considered unnecessary to show or describe in detail) for adjusting the position of pin 12. When the facing tool 8 has finished surface 11 to the desired distance from surface 10, the pins 9 and 12 contact, closing an electric circuit from battery 18, wire 19, pins 12 and 9, plate 2 and wire 20, thus energizing an alarm 21 located in the circuit, to indicate that the proper thickness of material has been obtained.

The ring 6 which is to form the test specimen may then be cut out by means of a rotary cutting tool 22, such as is shown in Figs. 6 and 7. The tool 22 may be provided with a pilot pin 23, similar to member 9 previously described, and one or more cutters 24 are secured to the body of the tool, for example by screws 25. By the operation of the above rotary cutting tool 22, a test specimen 6 is obtained which may be made exactly of standard thickness and diameter, which specimen may then be subjected to any desired tests or examination.

In Figs. 13 and 14 there is illustrated a type of cutting tool which may be employed to remove test specimens from bulky bodies of material which are too thick to be cut through in the manner above described. As shown in said figures, such cutting tool has a shank 26 provided at its lower end with a pilot pin 27, similar to pins 9 and 23 previously described. A V block 28 is fixedly secured to the lower portion of shank 26, and is provided with slots 29 adapted to receive slidably the cutting tools 30. A bushing 31 is rotatably mounted between collars 32 and 33 on shank 26, and such bushing carries a pair of pinions 34, on a shaft 35, which may be operated by handwheel 36. The bushing 31 is provided with a pair of slots 37 on opposite sides of shank 26, and a pair of slidable racks 38 are received within such slots so that the racks may be moved up and down by rotation of spindle 35. At their lower ends these racks have rollers 38ª bearing upon a plate 39 connected to each of the cutters 30, by a link 40 pivoted both to the plate 39 and ear 41 on the corresponding cutter. A spring 42 compressed between the V block 28 and plate 39 tends to maintain the plate in uppermost position so as to withdraw cutters 30 within V block 28, but as handwheel 30 is rotated to force downwardly the racks 38, the plate 39 is correspondingly moved to advance cutters 30 into operative position. The cutters thus converge progressively as they are fed into the work by turning handwheel 36, and remove a conical piece of material from the body to be tested, such as is shown in Fig. 15. A test section similar to the ring shown in Figs. 8 and 9 may then be obtained by machining up the conical piece shown in Fig. 15, as indicated by dotted lines 43 and 44.

In testing steel plates or similar constructions of the character previously described, the tensile strength of the material is ordinarily an important question to be determined, and the invention therefore comprises a method and apparatus whereby a test specimen, particularly one of such small size as the ring 6 above described, may be readily operated upon to determine its tensile strength. It has been found that if such a ring be subjected to outwardly or radially directed forces, the behavior of the ring when subjected thereto gives a reliable indication of its tensile strength. Fig. 11 shows a ring 6 placed over a die 45, having a hole 46 alined with the hole 7 within the test specimen. A tapered plug 47, preferably having an undercut portion 48 adjacent its head, is projected through hole 7 within the test specimen 6, and measured forces are applied to the tapered plug in order to determine the effect of given stresses upon the specimen. If desired, the hole within the ring 6 may be given a taper 7ª, corresponding to taper of plug 47, as shown in Fig. 10. If this is done, the plug will tend less to crush the walls of the hole as it is forced into the ring. Or, as indicated in Fig. 12, a plurality of sector-like wedge members 49, having their outer surfaces cylindrically curved and their inner surfaces flat to correspond to a polygonal taper plug 47ª, may be interposed between the specimen 6 and the plug, thus avoiding the tendency of the plug to crush the inner walls of the specimen 6, and reducing friction to a large extent.

In Figs. 16 and 17 a plug testing device, such as described in connection with Figs. 11 or 12, is shown assembled in position between the opposed heads 50 and 51 of a testing machine. The testing apparatus as a whole is carried upon a base 52, having a recess 53 adjacent its top surface within which rests a die 45 of the character described in connection with Fig. 11. A plurality of posts 54 extend from the base 51 and slidably support a crosshead 55, having a cylindrical hub 56 for receiving tapered plug 47. The apparatus is carefully made so that the hole within the hub 56 will accurately aline the tapered plug 47 with the hole 46 in die 45, thus placing uniform stresses upon the ring 6 when plug 47 is advanced into it. A cap 57 having a recess 58, corresponding to the shape of head 48 on tapered plug 47, is attached to the head 50 of the testing machine in such manner that the testing apparatus carried as a whole by base 52, can readily be slid into and out of position between the heads 50 and 51. A micrometer dial 59 is carried by crosshead 55, and its pointer 60 (Fig. 16) bears against a stationary inclined straight edge 61, so that the micrometer indicates the amount of vertical movement of the crosshead and tapered plug while the test is being carried on. The straight edge 61 is preferably pivoted to an end plate 62 at the upper end of guide posts 54, and is angularly adjustable at its lower end, as by means of a set screw 63 extending through a slot 64 in the straight edge 61 and engaging the base 52. If the specimen to be tested is exceedingly ductile, the movement of plug 47 into the specimen may be relatively great, so that a slight taper of straight edge 61 can be secured by the operation of adjusting screw 63 above described; or if the test specimen is very brittle, a great inclination of the straight edge 61 will be desirable in order to magnify the reading of the micrometer dial 59 after a relatively small movement of taper plug 47 into the test specimen. If desired, the downward movement of taper plug 47 may also be registered on a plurality of fixed indicator bars 65, over which moves a sight 66 carried by the crosshead 55. The readings on each indicator bar show the amount of downward movement of a plug 47 having a given taper, for the corresponding position of crosshead 55.

A counterweight 67 (Fig. 17) is secured to crosshead 55 by means of a cord 68 passing over rollers 69 and 70, such counterweight enabling greater accuracy to be obtained in the readings of force applied to the ring, since it removes the weight of the crosshead, tapered plug, etc., from the ring while the latter is under test, and also prevents a sudden fall of the crosshead.

It has been found that the behavior of a ring, when subjected to the plug test above described, gives a very reliable indication of the tensile strength of the material of which the ring is formed, the values obtained by the plug and ring test bearing a substantially constant relation to those which are obtained when the material is subjected to the ordinary elongation tests of a testing machine.

Fig. 18 shows a ring test specimen supported upon a die 45 (Fig. 16), and with a gage indicated generally by 71 applied thereto to measure the change in shape of the specimen when the tapered plug 47 is forced into the same.

As shown in detail in Fig. 19, the gage 71, which is termed a ductility gage, comprises an annular body portion 72 adapted to surround the ring 6, and having means for positioning the test specimen centrally within the gage. In the form illustrated, a fixed abutment 73 coöperates with a pair of spring-pressed plungers 74, adjustable by thumb screws 75, to bring the test specimen 6 into central position within the gage when the latter is applied to the specimen. As appears in Fig. 20, a plurality of screws 76, or some similar device, are used to maintain the body portion 72 of the ductility gage level within the testing machine. A bracket 77 (Figs. 16 and 17) supports the graduated arm 78 extending from the body portion 72 thereof, adjusting screws 79 being provided to bring the arm 78 to a horizontal position. A strap 80 (Fig. 19) slides along arm 78 in the usual manner, and carries a micrometer dial 81, having a pointer 82, the position of which is controlled by a reciprocable plunger 83. A flexible band 84 is suitably secured to plunger 83, and passes around the test specimen 6 in such manner that as the cross sectional area of the test specimen changes, the amount of the change will be registered on the dial 81. As shown, band 84 consists of a fine steel spring passing through a slot 85 within the body portion 72 of the gage and encircles the test specimen, with the free end of the band suitably fixed within a slot 86 in alinement with the slot 85 previously described. The outer end of micrometer plunger 83 is pressed outwardly by means of a coil spring 87, which maintains the band 84 taut during the operation of the gage, and insures that any change of shape of the test specimen will be accurately recorded.

While a particular series of operations, as carried out by certain tools and apparatus, have been described above to disclose an embodiment of the invention, it is obvious that many changes may be made without departing from the principle of the invention as defined in the following claims:

I claim:

1. The method of operating upon a member to be tested, which comprises removing a small section therefrom to obtain a test specimen, and refilling the void within said member which was formed by the removal of said section.

2. The method of operating upon a metallic member to be tested, which comprises removing a small section of said member to obtain a test specimen, and depositing metal to fill the void within said member which was formed by the removal of said section.

3. The method of operating upon a large structure to be tested, which comprises removing a small section therefrom *in situ*, to obtain a test specimen, and refilling the void within said structure which was formed by the removal of said section.

4. The method of operating upon a large welded metallic structure to be tested, which comprises removing a small section of the welded portion of said member *in situ*, to obtain a test specimen, and depositing metal to fill the void within said member which was formed by the removal of said section.

5. The method of operating upon a member to be tested, which comprises drilling a hole therein, and cutting out a circular test section of the member by employing the hole as a center for a rotary cutting tool.

6. The method of operating upon a metallic sheet to be tested, which comprises drilling a hole therethrough, and cutting out a ring therefrom to obtain a test specimen, by employing the hole as a center for a rotary cutting tool.

7. The method of operating upon a large structure to be tested, which comprises drilling a hole therein while the structure is *in situ*, and cutting out a circular test section from the structure, by employing the hole as a center for a rotary cutting tool, the last mentioned operation also being carried on while the structure is *in situ*.

8. The method of operating upon a metallic sheet to be tested, which comprises drilling a hole therethrough adjacent the point desired to be tested, finishing the sheet to the desired thickness by employing the hole as a center for a rotary facing tool, and cutting out a ring-like test section finished to the desired thickness, by employing the hole as a center for a rotary cutting tool.

9. The method of operating upon a member to test its strength without mutilation thereof, which comprises removing a small section therefrom to obtain a test specimen, subjecting said specimen to mechanical strains to determine its strength, and refilling the void within said member which was formed by the removal of said section.

10. The method of operating upon a metallic member to test its strength without mutilation thereof, which comprises removing a small section therefrom to obtain a test specimen, subjecting said member to mechanical strains to determine its strength, and depositing metal to fill the void within said member which was formed by the removal of said section.

11. The method of operating upon a large metallic structure to test its strength without mutilation thereof, which comprises cutting out a small section thereof *in situ*, to obtain a test specimen, subjecting said specimen to mechanical strains to determine its strength, and refilling the void within said structure which was formed by the removal of said section.

In testimony that I claim the foregoing, I have hereunto set my hand this 24th day of January, 1920.

JAMES W. OWENS.